United States Patent [19]
Flory, deceased et al.

[11] Patent Number: 5,272,019
[45] Date of Patent: Dec. 21, 1993

[54] ELECTROCHEMICAL STORAGE CELL

[75] Inventors: Wilfried Flory, deceased, late of Brëhl, by Brigitte Waibel-Flory, heir; Paul G. Kaehler, Heidelberg; Stefan Mennicke, Leimen-Gauangelloch, all of Fed. Rep. of Germany

[73] Assignee: ABB Patent GmbH, Mannheim, Fed. Rep. of Germany

[21] Appl. No.: 938,865

[22] Filed: Aug. 31, 1992

[30] Foreign Application Priority Data

Aug. 29, 1991 [DE] Fed. Rep. of Germany ....... 4128719

[51] Int. Cl.$^5$ .......................................... H01M 10/39
[52] U.S. Cl. ................................................. 429/104
[58] Field of Search ................ 429/104, 103, 112, 193

[56] References Cited

U.S. PATENT DOCUMENTS 4,956,246 9/1990 Kamuf et al. ..................... 429/104

*Primary Examiner*—Anthony Skapars
*Attorney, Agent, or Firm*—Herbert L. Lerner; Laurence A. Greenberg

[57] ABSTRACT

The invention relates to an electrochemical storage cell based on sodium and sulphur. A disadvantage of the known storage cells of this type is the fact that if assembled to form batteries, failures of individual storage cells result in fairly large capacity losses of the battery. These disadvantages are avoided by fixing the quantitative ratio of sulphur to sodium as a function of the rated capacity of the storage cell in such a way that the voltage at the end of the rated discharge has a specified value and the sodium polysulphide which forms during the discharge has a specified composition.

6 Claims, 3 Drawing Sheets

ELECTROCHEMICAL STORAGE CELL

The invention relates to an electrochemical storage cell based on sodium and sulphur, having an anode space and a cathode space being separated from one another by an alkali-ion-conducting solid electrolyte and being bounded at least regionally by a metallic housing.

Such electrochemical storage cells are very well suited as energy sources. They are being increasingly used in constructing high-energy batteries which are provided for supplying power to electric vehicles.

Examples of such storage cells are those based on sodium and sulphur, which are rechargeable and contain a $\beta$-aluminum oxide solid electrolyte which separates the anode space from the cathode space.

An advantage of the storage cells which should be stressed is that no electrochemical side reactions proceed during the charging of the same. The capacity of sodium/sulphur storage cells is dependent on the size of the solid electrolyte. Since they cannot be made as large as would be desirable, in order to achieve a specified capacity, series-connected storage cells are additionally wired in parallel with one another. Temperature variations in the storage cell or extreme loads imposed on the ceramic may lead to its fracture. That results in failure of the storage cell concerned. Since individual storage cells rapidly become highly resistive after failure, it is necessary to provide cross connections which prevent the loss of the capacity of a complete bank after the failure of the storage cell. The remaining, intact storage cells then have to carry the entire battery current. In order to ensure that the failure of one storage cell does not immediately result in the loss of the entire capacity of a bank, the intact banks must also be capable of deep discharge to a certain degree in order to compensate at least partly for the loss of capacity. However, if discharge is too deep, a depletion of sodium in the region of the solid electrolyte results, and that brings about the failure of further storage cells. In known installations of that type, the groups of storage cells between two cross connections are monitored in order to avoid such a problem. In addition, a deep discharge of the high-energy battery is prevented. The result of such a method is that in practice, the energy density which is to be expected on the basis of the structure of the storage cells cannot be achieved in the battery. Not least among the reasons for that fact is the construction of the storage cells. Since the achievable energy density is greatest if discharge is carried out to such an extent that the sodium polysulphide formed during the discharge has the composition $Na_2S_{2.7}$, the storage cells are constructed for that depth of discharge. The increase in energy density for a discharge beyond $Na_2S_4$ is only very slight. In addition, the utilization of the entire single-phase region of the sodium polysulphide melt brings about a few substantial disadvantages. Those are the increased corrosion of the components, the decreasing battery voltage, the increasing resistance of the battery and the increase in the entropy of reaction, with the result that, all in all, a rise in the power loss is produced.

It is accordingly an object of the invention to provide an electrochemical storage cell, which overcomes the hereinafore-mentioned disadvantages of the heretofore-known devices of this general type and which makes it possible to construct a high-energy battery in which the disadvantages of the prior art are eliminated.

With the foregoing and other objects in view there is provided, in accordance with the invention, an electrochemical storage cell based on sodium and sulphur, comprising an anode space, a cathode space, an alkali-ion-conducting solid electrolyte separating the anode and cathode spaces from each other, a metallic housing at least regionally bounding the anode and cathode spaces, and a quantitative ratio of sulphur to sodium as a function of a rated capacity being fixed for specifying a voltage value at an end of a rated discharge and for specifying a composition of sodium polysulphide forming during discharge.

In accordance with another feature of the invention, the quantitative ratio of sulphur to sodium is dimensioned in such a way that the open-circuit voltage for rated discharge is 1.85 to 2.02 V.

In accordance with a further feature of the invention, the sodium polysulphide which forms during the discharge has, at the end of the rated discharge, a composition which covers the range between $Na_2S_{4.5}$ and $Na_2S_{3.5}$ and includes the limiting values.

In accordance with an added feature of the invention, the quantitative ratio of sulphur to sodium is fixed in such a way that the number of moles of sulphur to sodium is greater than 3:2.

In accordance with an additional feature of the invention, the quantity of sodium includes a deep-discharge reserve which is greater than or equal to 15% and less than or equal to 30%. In addition, a secondary reserve of about 5% is provided which still ensures wetting of the solid electrolyte with sodium in an adequate quantity in the event of unfavorable tolerance zone positions.

In accordance with a concomitant feature of the invention, the quantity of sodium contains a deep-discharge reserve being dimensioned for preventing formation of $Na_2S_x$ in the event of a short circuit, wherein x has a value being at most substantially equal to 3.0.

Other features which are considered as characteristic for the invention are set forth in the appended claims.

Although the invention is illustrated and described herein as embodied in an electrochemical storage cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
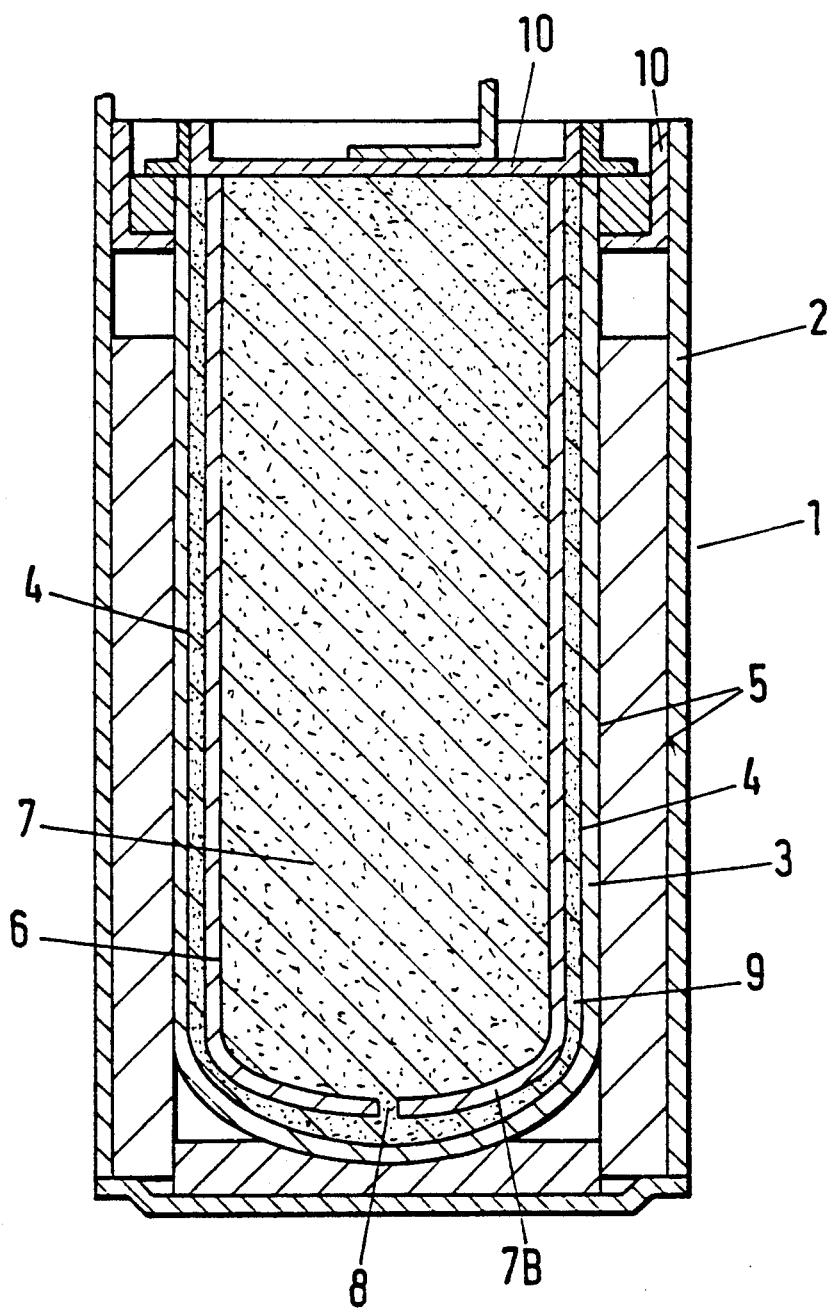
FIG. 1 is a fragmentary, diagrammatic, longitudinal-sectional view of an electrochemical storage cell in accordance with the invention.

Referring now to the FIGURES of the drawing in detail and first, particularly, to FIG. 1 thereof, there is seen an electrochemical storage cell 1 which is bounded on the outside by a beaker-shaped housing 2 made of a corrosion-resistant metal.

Disposed inside the housing 2 is a solid electrolyte 3 which is also beaker-shaped and which is made of an ion-conducting material, preferably $\beta$-aluminum oxide. An inner region of the solid electrolyte 3 is used as anode space 4. The dimensions of the solid electrolyte 3 are chosen in such a way that a continuous gap 5, which serves as a cathode space, is formed between the inner surfaces of the housing 2 and the outer surfaces of the solid electrolyte 3. The interior of the solid electrolyte 3 contains a safety insert 6 which is filled with sodium 7. The solid electrolyte 3 has a closed end and the safety insert 6 has a base 7B adjacent the closed end with an opening 8 formed therein, through which sodium can flow into a safety gap 9. The safety gap 9 is situated between the outer surface of the safety insert 6 and the inner surface of the solid electrolyte 3. The storage cell 1 has a closure 10 which seals it from the outside and simultaneously separates the two reactant spaces from one another.

The storage cell 1 shown in FIG. 1 is constructed in such a way that it has a rated capacity of 53.6 Ah. This requires 46g of sodium. Furthermore, a deep-discharge reserve of sodium is provided which is greater than or equal to 15% and less than or equal to 30%. This requires a sodium content of 53g. The additional quantity of sodium which is necessary to fill the dead volume of the Na electrode in the event of an unfavorable tolerance zone position, is about 5g. The sodium electrode is combined with a sulphur electrode which contains 128g of sulphur. The data of the sodium electrode consequently resulting from the discharge of the storage cell are shown below:

| Charge | Composition | Open-circuit voltage | Volume |
| --- | --- | --- | --- |
| Rated discharge | $Na_2S_4$ | 1.93 V | 90.0 cm$^3$ |
| Deep discharge | $Na_2S_{3.5}$ | 1.87 V | 95.3 cm$^3$ |
| Full discharge | $Na_2S_{3.2}$ | 1.83 V | 98.4 cm$^3$ |

Since sodium polysulphides have an absolute maximum density for the composition $Na_2S_4$, the volume ratios are very favorable.

In order to achieve the above-mentioned rated capacity, a volume of 100 cm$^3$ must be available in the cathode space for the full discharge of the storage cell. The volume of the anode space 4 must also be 100 cm$^3$, including the safety insert 6. With allowances for the solid electrolyte, the cell closure, the housing and terminal lugs, this leads to a total storage cell volume of about 300 cm$^3$. 110 Wh are stored in this volume. At the end of the rated discharge, the storage cell 1 in accordance with the invention delivers a voltage of 1.94 V at a current of 74 amperes and a power output of 100 W. Under these circumstances, the power loss is 44 W. A conventional storage cell constructed for a rated discharge to $Na_2S_3$ requires a sulphur electrode having a volume of 86 cm$^3$. Since the other components of the volume are about the same, this results in a total volume of 285 cm$^3$ for this storage cell. However, due to the lower average voltage, this cell only stores 107 Wh. If a conventional storage cell is to deliver an output of 100 W at the end of discharge, the power loss is 80 W for an internal resistance of 8 mOhm. The associated current is 100 A.

Figure 2:
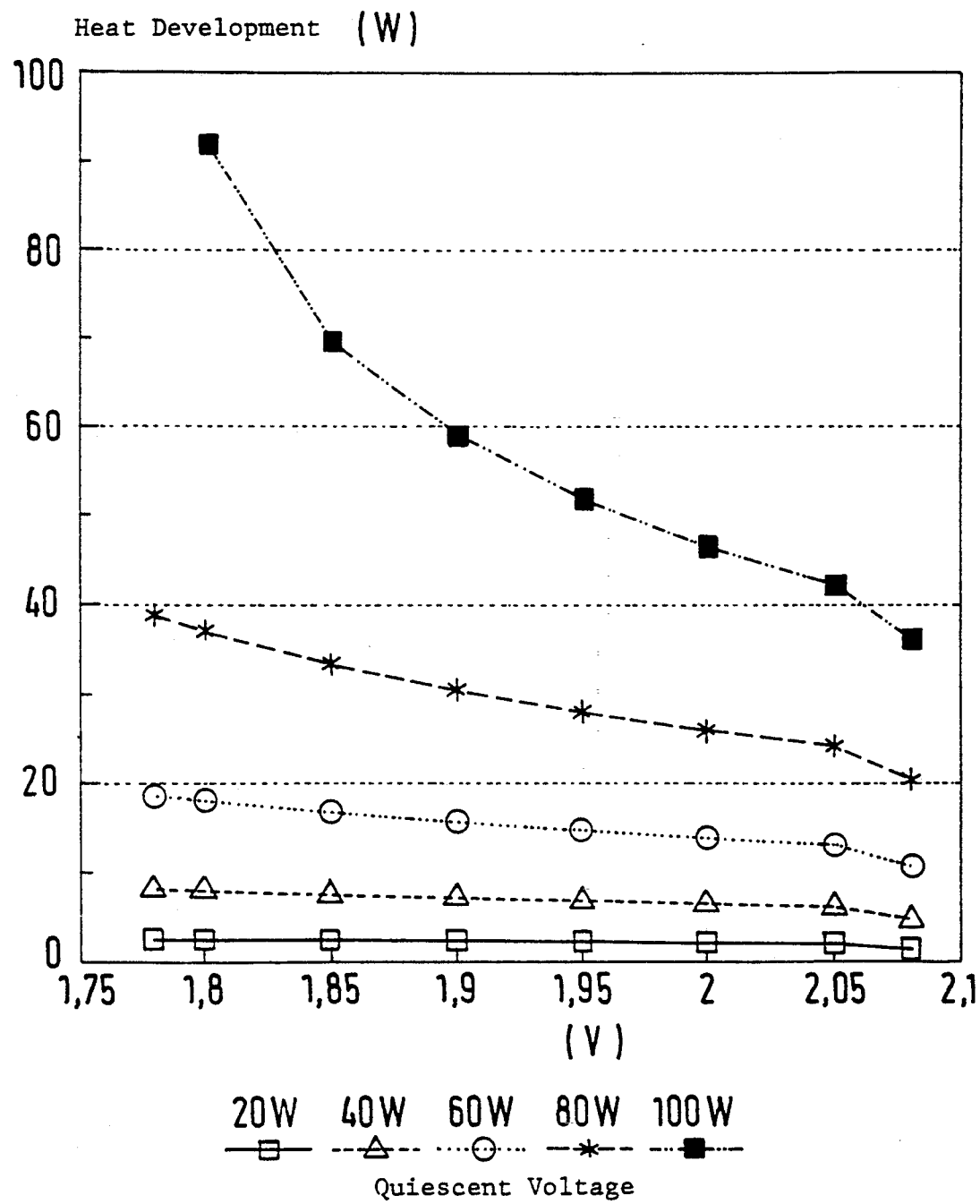
FIG. 2 is a graph showing the heat developed by the storage cell in accordance with the invention, as a function of the charge state.
Figure 3:
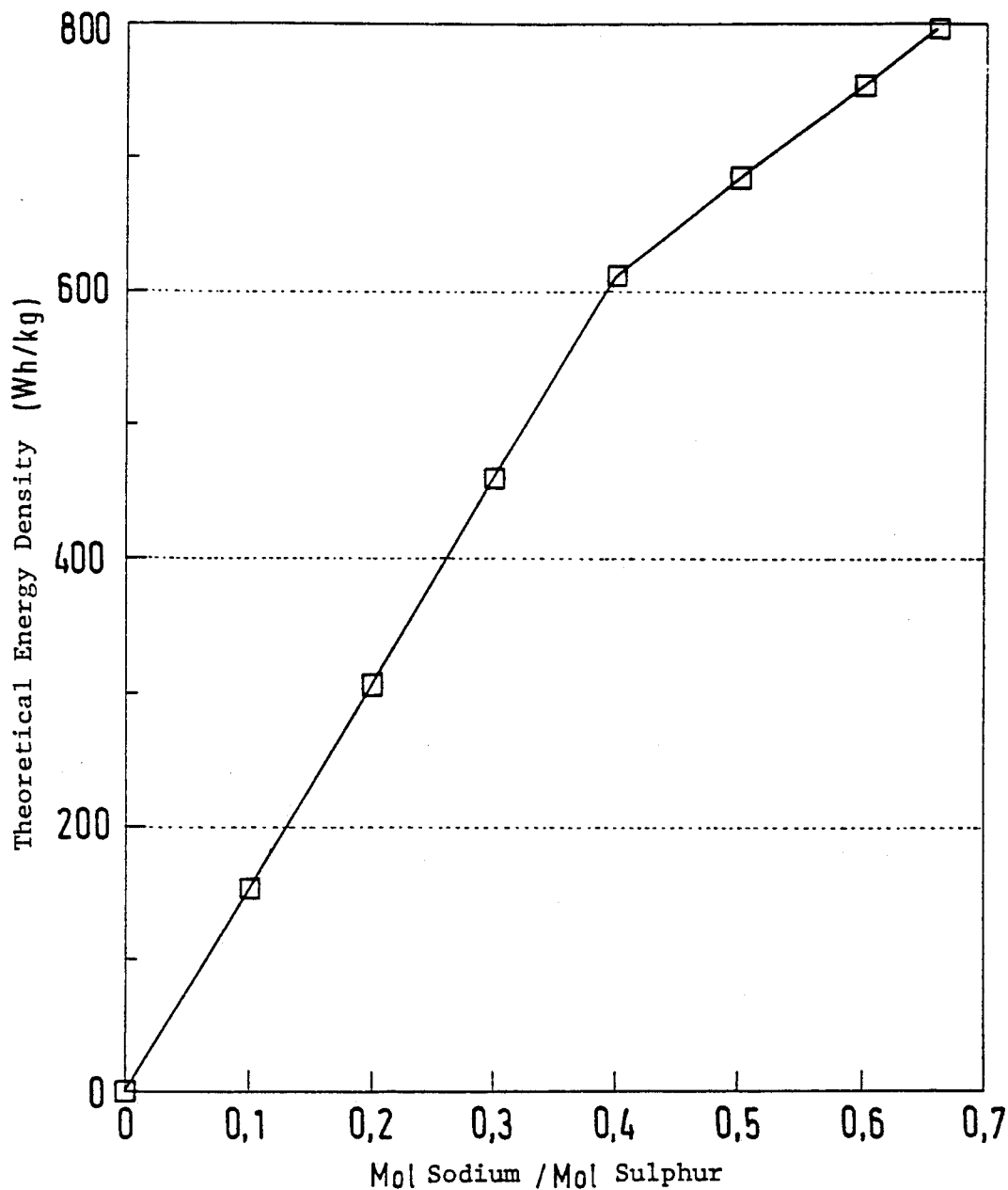
FIG. 3 is a graph showing the energy density as a function of the depth of discharge.

As is shown in FIG. 2, the storage cell 1 in accordance with the invention delivers 1.94 V and 74 A at the end of discharge and has a power of 100 W. The power loss is 44 A. FIG. 3 shows the energy density of the storage cell 1 as a function of the depth of discharge. The comparison of a conventional storage cell having a terminal voltage of 1 V for a power output of 100 W at the end of discharge with the storage cell in accordance with the invention, which has a terminal voltage of 1.3 V under analogous conditions, shows that an unlimited utilization of the capacity of a conventional storage cell is not possible even in the voltage range in which most loads operate.

We claim:

1. An electrochemical storage cell based on sodium and sulphur, comprising an anode space, a cathode space, an alkali-ionconducting solid electrolyte separating said anode and cathode spaces from each other, a metallic housing at least regionally bounding said anode and cathode spaces, and a quantitative ratio of sulphur to sodium as a function of a rated capacity being fixed for specifying a voltage value at an end of a rated discharge and for specifying a composition of sodium polysulphide forming during discharge, said fixed quantitative ratio of sulphur to sodium setting a number of moles of sulphur to sodium being grater than substantially 3:2.

2. An electrochemical storage cell based on sodium and sulphur, comprising an anode space, a cathode space, an alkali-ion-conducting solid electrolyte separating said anode and cathode spaces from each other, a metallic housing at least regionally bounding said anode and cathode spaces, and a quantitative ratio of sulphur to sodium as a function of a rated capacity being fixed for specifying a voltage value at an end of a rated discharge and for specifying a composition of sodium polysulphide forming during discharge, said fixed quantitative ration of sulphur to sodium setting the voltage at the end of the rated discharge at substantially from 1.85 to 2.02 V.

3. An electrochemical storage cell based on sodium and sulphur, comprising an anode space, a cathode space, an alkali-ion-conducting solid electrolyte separating said anode and cathode spaces from each other, a metallic housing at least regionally bounding said anode and cathode spaces, and a quantitative ratio of sulphur to sodium as a function of a rated capacity being fixed for specifying a voltage value at an end of a rated discharge and for specifying a composition of sodium polysulphide forming during discharge, said fixed quantitative ratio of sulphur to sodium giving the sodium polysulphide forming during the discharge a composition at the end of the rated discharge covering a range between $Na_2S_{4.5}$ and $Na_2S_{3.5}$ and including the limit values.

4. An electrochemical storage cell based on sodium and sulphur, comprising an anode space, a cathode space, an alkali-ion-conducting solid electrolyte separating said anode and cathode spaces from each other, a metallic housing at least regionally bounding said anode and cathode spaces, and a quantitative ratio of sulphur to sodium as a function of a rated capacity being fixed for specifying a voltage value at an end of a rated discharge and for specifying a composition of sodium polysulphide forming during discharge, said quantity of sodium containing a deep-discharge reserve being dimensioned for preventing formation of $Na_2S_x$ in the event of a short circuit, wherein x has a value being at most substantially equal to 3.0.

5. An electrochemical storage cell based on sodium and sulphur, comprising an anode space, a cathode space, an alkali-ion-conducting solid electrolyte separating said anode and cathode spaces from each other, a metallic housing at least regionally bounding said anode and cathode spaces, and a quantitative ratio of sulphur to sodium as a function of a rated capacity being fixed for specifying a voltage value at an end of a rated discharge and for specifying a composition of sodium polysulphide forming during discharge, said quantity of sodium including a secondary reserve being dimensioned for ensuring wetting of said solid electrolyte with sodium, even in the case of a deep discharge.

6. An electrochemical storage cell based on sodium and sulphur, comprising an anode space, a cathode space, an alkali-ion-conducting solid electrolyte separating said anode and cathode spaces form each other, a metallic housing at least regionally bounding said anode and cathode spaces, and a qualitative ratio of sulphur to sodium as a function of a rated capacity being fixed for specifying a voltage value at an end of a rated discharge and for specifying a composition of sodium polysulphide forming during discharge, said quantity of sodium including a deep-discharge reserve of more than substantially 15% and at most substantially 30%, and a secondary reserve of substantially 2.5% to 10%.

* * * * *